Figure 1:
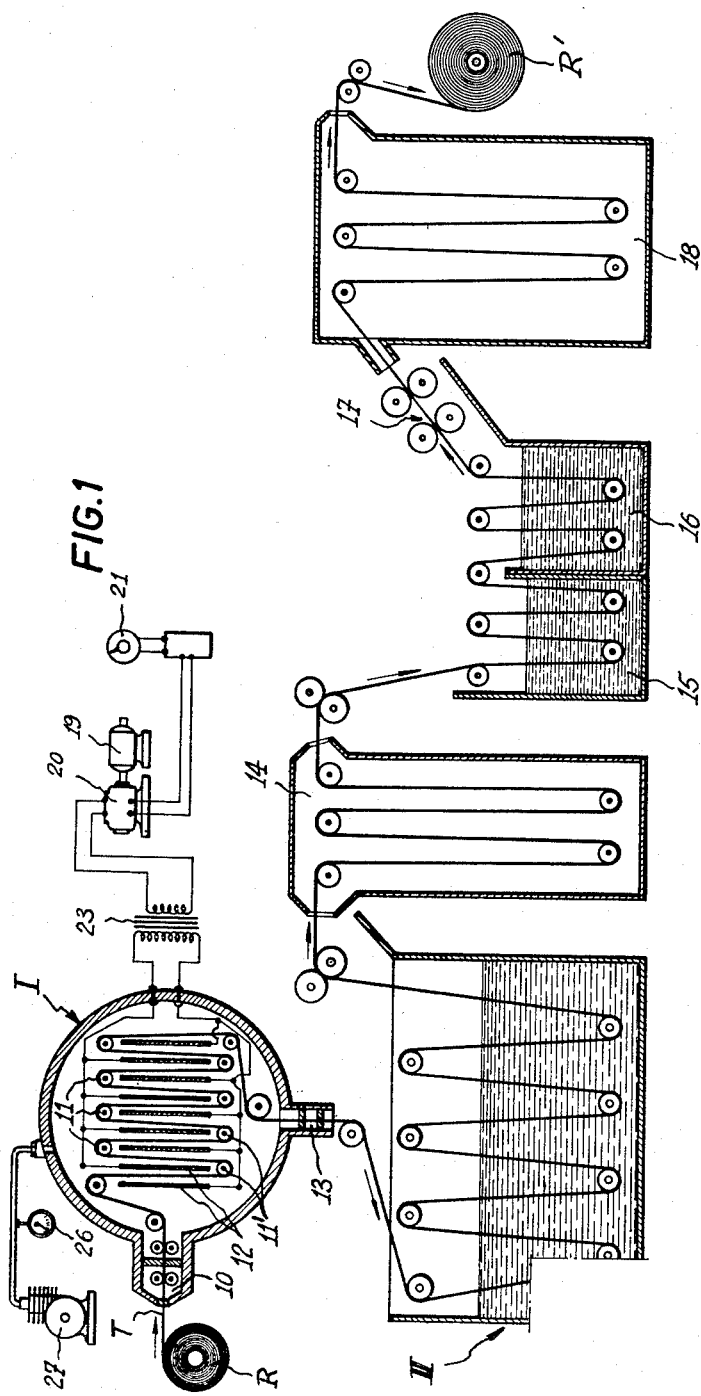

April 20, 1965    P. KASSENBECK    3,179,482
SILENT ELECTRIC DISCHARGE DYEING OF WOOL
Filed Jan. 31, 1961    3 Sheets-Sheet 2

April 20, 1965   P. KASSENBECK   3,179,482
SILENT ELECTRIC DISCHARGE DYEING OF WOOL
Filed Jan. 31, 1961   3 Sheets-Sheet 3
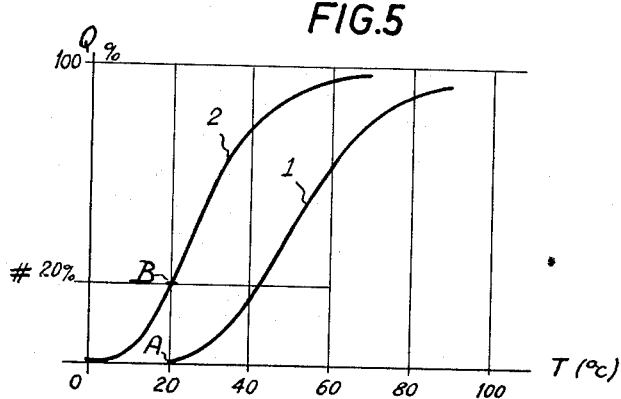
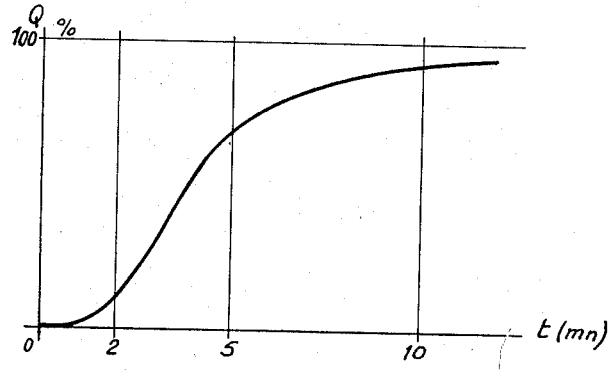
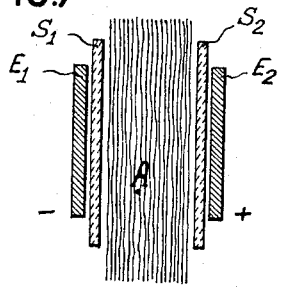
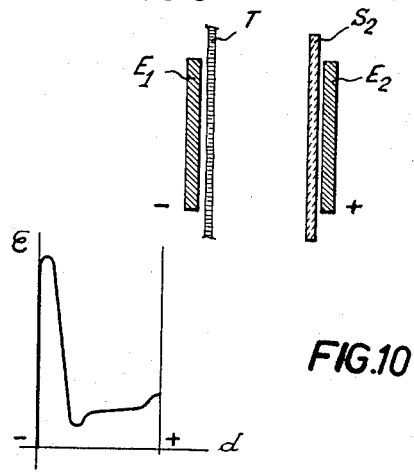
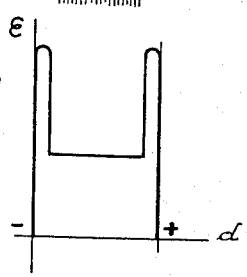
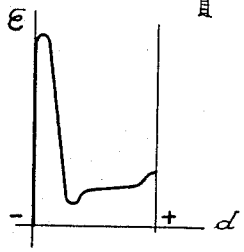

3,179,482
SILENT ELECTRIC DISCHARGE DYEING OF WOOL

Paul Kassenbeck, Ville-d'Avray, France, assignor to Institut Textile de France, Paris, France, a French industrial technical centre
Filed Jan. 31, 1961, Ser. No. 86,146
Claims priority, application France, Feb. 3, 1960, 817,413, Patent 1,256,046; 817,414, Patent 1,256,047
6 Claims. (Cl. 8—2)

The present invention relates to a process for the treatment by a liquid agent, particularly for dyeing and/or printing, of keratinous fiber, especially wool.

This process of this invention comprises two successive treatments, the first having the effect of modifying the physico-chemical properties of the keratinous fibers and, in particular, their properties of resistance to felting and affinity to a liquid agent, for example their ability to take a dye, and the second effecting the application of the liquid agent, for example the dyeing and/or printing of the material, under very improved efficiency conditions, compared with known conditions for treatment of keratinous fibers by the same liquid agent.

It should be understood that the expression "keratinous fibers" as used herein is intended to include finished articles such as fabrics, textile materials, knitwear, felts and furs as well as the fibers themselves at different stages of their transformation i.e. in the form of cardings, threads, rovings, skeins or flock and like materials, and that the fibers being treated may either be pure or in a mixture with fibers of a different chemical nature.

It is known that the superficial structure of keratinous fibers is characterized by the presence of a surface scale of an extremely thin layer (of a thickness of the order of 0.01 to 0.05$\mu$) of a water repellant substance which is known as "epicuticle."

Examination with an electron microspoce (using magnifications up to 150,000 times) of keratinous fibers which have been subjected to the action of an electric discharge in a rarified atmosphere for a limited period of time has revealed that, as a consequence of a phenomenon resulting from the ionic bombardment of the surface of the fibers, the latter is scoured to a depth of some hundreds of Angstroms in such a way that the epicuticle is eliminated. As a result of this phenomenon, the fibers treated by the electric discharge lose their water repellant character so that their kinetics of wetting and absorption are greatly modified and so that in particular the speed of diffusion of colorants in the fibers is considerably accelerated in an aqueous medium.

The present invention consists, in one aspect, of putting this fact to use in order to improve the treatment of fibers, and in particular to improve processes of dyeing and printing such fibers.

Moreover, by reason of the modification of the superficial structure of the fibers, their frictional properties are also modified; thus with curled fibers of bilateral structure the coefficients of friction are equalized over the circumference of the fibers and the latter, because of this, lose the greater part of their felting power. A fundamental advantage of the process forming the object of the invention therefore results from the fact that apart from the improvement in the conditions for coloring or printing, there is obtained at the same time, after the first stage of the process, remarkable non-felting properties which confer on articles made of these fibers an excellent dimensional stability.

In other words, the carrying out of the combined process steps of eletcric discharge and coloring or printing according to the invention renders superfluous any treatment normally applied to wool, or keratinous fibers other than wool, for the purpose of giving "non-shrinking" properties to articles made from these fibers.

The present invention thus consists in a process of treating, particularly for coloring and printing, keratinous fibers which consists in the steps of subjecting a material comprising at least in part keratinous fibers to ionic bombardment under the action of an electric discharge in a rarified atmosphere, and then subjecting the material to a treatment by a liquid medium, in particular an aqueous medium, such as dyeing and/or printing treatment.

From the practical point of view this second stage will in many cases, in particular after dyeing, be followed by usual operations of, for example, thermo-fixing the coloring material, of washing, rinsing and drying.

The carrying into effect of this process is dependent upon the influence of at least three principal factors.

The first two of these factors should be considered together: they concern, firstly, the degree of exposure of the article to the first stage i.e. to the ionic bombardment, this degree being capable of being modified either by varying the duration for a given intensity of the electric field or by varying this intensity for a given duration of exposure, and, secondly, the degree of action of the dyeing bath, this degree being able itself also to be modified, more especially by varying the temperature of the bath and/or the duration of the treatment in the bath.

It should be noted that in any case the pasage of the fibers through the first stage of the process allows both the duration and the temperature of dyeing to be reduced considerably compared with the time and temperature required, other conditions being the same, for an identical article which has not been subjected to a preliminary ionic bombardment.

Thus, by way of example, it has been found that for a serge-like woolen material known as "Merino 110 quality" (according to the French classification of Dantzer and Roehrich and corresponding, according to A.S.T.M. standards, to a wool of 70s quality) dyed in an open bath at 80° C. with a colorant of the metalliferous-type (Neolane Blue 2G), the quantity of colorant fixed in fifteen minutes by a sample previously subjected to the action of an electric discharge (3.5 kv.; 100 mm. Hg; 500 cycles per second; inter-electrode distance 10 mm.; glass stabilization layer 3 mm. thick) corresponds to the quantity of colorant fixed by a similar sample, not treated by ionic bombardment, in an identical dyeing bath (bath ratio 1/50; concentration of the colorant 4%; sulphuric acid 4%; sodium sulphate 15%; in relation to the weight of the wool) after an hour of dyeing at boiling point. The evaluation of the depth of shade obtained during the course of the dyeing is easily carried out by comparative visual examination of the samples after dyeing.

The third factor of importance in carrying out the process according to the invention is the disposition of the material subjected to the electric discharge in relation to the conditions of formation of the discharge. It is in fact important to remember that the electric field which is established between the electrodes of a condenser, which will be hereinafter referred to as a discharge "reactor," varies not only with the tension applied to the terminals of the condenser but also with the nature, the thickness, the number and the disposition of the di-electric stabilization layers of insulating material interposed between these electrodes.

This influence will be better understood by considering the phenomenon of the formation of the field between the electrodes during a half-cycle of the supply current of the reactor.

If, in a first case, the condenser includes two similar stabilization layers disposed respectively adjacent its two electrodes, the electric field which will be established in the course of a half-cycle in the space between the stabilization layers will, during a considered time interval, have the same mean value at any point in this space, excluding edge effects. The inversion of the polarity of the electrodes during the following half-cycle will not bring about any modification of this distribution of the electric field so that it may be assumed that the material to be treated can be placed at any position between the stabilization layers of the discharge reactor, the fibers then all being treated under the same conditions in the course of their passage through the reactor. This disposition is convenient for the treatment of large masses of fibers when the material is present in a very open form, for example in the form of strips or sheets of fibers or articles with a very open texture. This material can then be subjected to the first stage of the treatment according to the invention between one or several pairs of electrodes connected in parallel, the length of the path of the material between the plates of the condenser being calculated in relation to its speed of movement so as to ensure the required duration for the first stage of the treatment.

If, in a second case, the condenser includes only a single stabilization layer adjacent the electrode raised to the positive potential, the value of the electric field during the half-cycle under consideration will pass a very high maximum near the opposite electrode which is at the negative potential in such a way that within this zone there appears a potential gradient which is also very high and which produces the main influence of the electric field near the negative electrode. This phenomenon will be reproduced at each half-cycle corresponding to this distribution of the potentials of the electrode.

In this particular case the efficiency of the first stage of treatment will vary as a function of the position of the article in the interelectrode space, the fibers located in the zone with a very high potential gradient, that is near the electrode opposite to that covered by the stabilization layer, being treated in a far more intense way than the others. If a uniform treatment is desired, it would thus be desirable, in principle, to group the fibers in this zone at as constant a distance as possible from the electrode. This would be convenient in the case of a relatively thin material such as a tissue.

The invention contemplates apparatus for carrying out the process above described, comprising in combination at least one pair of electrodes disposed in an evacuated or partially evacuated chamber and fed with electric current, particularly an alternating current, to produce an electric discharge in the rarified atmosphere of the chamber, and means for moving keratinous fibers through the field of the electric discharge. The apparatus preferably also comprises means for subsequently subjecting the keratinous fibers to a treatment by a liquid agent, and in particular to a dyeing or printing treatment.

The material comprising the keratinous fibers is preferably fed into and out of the chamber of the discharge reactor through air locks, and the chamber may be continuously evacuated to maintain the low pressure therein.

In one type of discharge reactor the or each condenser includes two stabilization layers of insulating material disposed respectively adjacent its two electrodes, and the material to be subjected to the electric discharge is moved between the two stabilization layers.

In another discharge reactor the condenser comprises only one stabilization layer and the material is subjected to the electric discharge by passing it near the electrode opposite to the stabilization layer.

The ionization of the gas which takes place in the electric field by virtue of the electric discharge is accompanied by the production of trains of current pulses which follow one another at very short intervals of the order of $1/100,000$ of a second, constituting an aperiodic high frequency phenomenon.

It has been determined that the scouring of the surface of the fibers by the ionized particles of gas is strictly localized at the places where these current pulses are produced during the electric discharge. This fact has led to an extremely important application of the present invention for producing differential treatments of the various fibers, and especially for differential dyeing.

Thus, instead of exposing the article to a uniform electric discharge resulting from the use of a pair of plane electrodes for example, electrodes of different shape or constitution can be used, for example perforated according to a particular pattern or carrying this pattern in relief. The discharge will thus form only over the metallic parts of the surface of the electrode, or its intensity will be a function of the local changes in distance between the two electrodes in the case in which one of these latter comprise reliefs, in such a way that the effects of the discharge will vary locally according to the appearance of the pattern or design of the electrodes. In the second stage of the process, these differences in the effect of the electric discharge will produce differences in the amount of the colorant in the fibers in such a way that there will be produced either a complete absence of coloring in the areas corresponding to the perforations in the electrode, or more intense coloring or shading effects at the places corresponding to the variations in the relief of the electrode.

According to a feature of the invention, instead of providing the electrodes with perforations or reliefs, which entails specially perforating the electrodes for each pattern and changing the electrode when the pattern is changed, use is made of masks or stencil plates of a non-conducting material which are likewise formed with a pattern or design in perforation or in relief, these members being directly placed against the surface of the treated material which is itself disposed adjacent to the electrode which is not covered by the stabilization layer. With this modification a comparable phenomenon will be produced, the effects of the electric discharge only appearing at the unprotected places and the "latent" image produced on the article being "revealed" by the dyeing.

In both cases, the second stage of the process which causes such latent images to appear could be carried out either in an open warm bath, in which case different color intensity effects will be obtained corresponding to the image, or by fulling, dyeing or the impregnation of the colorant at a low temperature, in which case the areas situated in front of the perforations in the electrode, or covered by the mask during the first stage, would not be dyed at all.

Among the applications of this process may be mentioned the reproduction of patterns or designs formed on or by masks of a non-conducting material such as paper, plastic material, lace and guipure of cotton thread, decorative perforated paper, corrugated paper, embossed paper, sheets of various materials cut out with scissors, or the like.

It should be noted that the application of the first stage to certain zones only of the material results in rendering only these zones resistant to shrinkage so that, in order to avoid partial shrinkage in the second stage, it is desirable that the material should, after dyeing the treated parts, be passed a second time through the discharge reactor. Alternatively, it could be desirable to make use of these differences in shrinking properties in order to produce special depression or embossing effects between the different zones of the article.

Therefore, the invention also concerns a process which enables, by the effect of the simple exposure of partial zones of an article to an electric discharge, not only zones with a preferential aptitude for dyeing and printing to be obtained, but also zones with a preferential aptitude to shrinkage. In this latter case, the juxtaposition of the zones with different shrinking properties can produce crimping or goffering of the article. Such zones can result from the exposure of a finished article to an electric discharge with the interposition of a stencil plate or screen having appropriate openings, or by weaving, knitting or the like of fibers which have been subjected to this exposure with other fibers which have not been subjected to it or have been subjected to it to a different degree.

An important industrial application of this differential treatment process can be achieved by the use of a cylindrical condenser which enables long continuous lengths of material to be unrolled and passed therearound, and enables the printing or reproduction of patterns or designs also of great length either by the reproduction of a short design which is repeated at regular intervals, for example on a mask in the form of an endless band, or by the reproduction of a design of great length carried by a mask which unrolls in synchronism with the article to be treated.

In the case of the application of patterns by the use of perforated electrodes, with a single stabilization layer interposed between the electrodes, it is also to be pointed out that the effect obtained on the article will be reversed according to the position of the material with reference to the perforated electrode, the pattern appearing either as a positive if the material is moved against the perforated electrode but outside the interelectrode space or as a negative if it is moved against the perforated electrode but within the interelectrode space. When the pattern is carried by a non-conducting mask, it is sufficient that it moves against the material and in synchronism with it between two electrodes. Thus the invention also employs an apparatus for the reproduction of decorative patterns on materials, said apparatus comprising, in a first part, a condenser adjacent the electrodes of which are moved in synchronism the material on which it is desired to reproduce the pattern and a stencil plate comprising the pattern to be produced and, in a second part, a system for applying a colorant by dyeing in an open bath, by fulling, by impregnation or by printing.

The process according to the invention is capable of numerous other applications resulting from the different affinities for the same colorant of fibers subjected to treatments by electric discharges of different intensity and/or duration. For example, material can be subjected to two or more successive treatments according to the invention in such a way as to obtain on the material the superimposition of different patterns and different colors and thus to produce polychromatic effects. For such purpose the process may, for example, be carried out in the following way: the undyed material, or material previously dyed in a light shade, is exposed for a first time to the action of an electric discharge. This treatment, which should be of short duration, is localized in the regions which are not protected by the mask carrying the first pattern to be reproduced. Under normal operating conditions, that is to say at 4 kv. alternating current, 100 mm. of Hg, 10 mm. distance between the electrodes, and a stabilization layer of "Bakelite" (registered trademark) which is 3 mm. thick, the duration of the first treatment is of the order of 30 seconds to one minute for a Merino type wool. The dyeing is then made in a deep shade preferably by hot impregnation (60 to 70° C.) and the time for the colorant to be taken up by the treated parts is about 5 to 10 seconds. The fixation of the coloring is effected by drying the material at 110° C. in an oven. After drying, the material is reintroduced into the discharge reactor and subjected to a second treatment, either with a pattern different from the first or with the same pattern but displaced on the material with regard to the first design, for example turned through 90°. The intensity and/or the duration of the discharge in the first stage of this second treatment is increased compared with the first discharge treatment (for example: 3 minutes of discharge instead of 30 seconds under the same conditions in the first treatment). In the second stage of the second treatment the material is dyed by impregnation in the cold (20° C.) in a light shade. The color is then only taken up by the parts which have been exposed to the discharge in the course of the second treatment and is not taken up by the parts exposed to the discharge during the first treatment which are already colored with a deep hue. After the second dyeing treatment the material is again raised to a temperature of 110° C. for 10 to 15 minutes, and is then well rinsed and finally dried.

By way of example, the reproduction of a "tartan" pattern on to a non-woven material, like felt, may be carried out as follows. Starting with a felt previously dyed yellow, in the first combined treatment of discharge and dyeing, bands of green color are caused to appear upon the yellow base as a result of the superimposition on the original yellow of a blue colorant used for the dyeing of the parts treated during the first discharge. In the second combined treatment of discharge and dyeing, bands perpendicular to the green bands are caused to appear upon the material. By using a red colorant these bands will be colored alternately orange-red and brown by the superimposition of the color red upon the two colors yellow and green of the first treatment.

In another application of this process, fibers with different sensitivities to the electric discharge can be mixed and these will take on different intensities of coloration during the second stage of the process, or fibers can be mixed of which only some have been subjected to an electric discharge, the mixed fibers being subjected together to the second stage of the process in such a way that only some fibers will be colored, etc.

By way of example of a particular application, may be quoted the application of the process according to the invention to the process of printing on to cardings known as "vigoureux."

The "vigoureux" process, already known per se, consists in printing, upon cardings of wool, bands of colors periodically spaced out in such a way that the threads manufactured from these cardings present the effect of a mixture of colored and non-colored fibers which gives a mottled appearance to articles manufactured with these threads. The cardings intended for treatment according to the "vigoureux" process and previously treated with an electric discharge will enable the efficiency of the printing following the application of the "vigoureux" process to be increased by ensuring, for a higher feed speed on the printing machine, a better penetration of the colorant into the cardings. However, while the "vigoureux" process is only used to obtain mottled effects, its combination with the discharge process applied to the stage of the carding before the "vigoureux" treatment not only enables a qualitative and quantative improvement of the output to be obtained but, moreover, guarantees, the non-shrinkability of the wool thus treated.

As other examples of modifications of the process according to the invention may be mentioned the combination of the electric discharge treatment with the application, to keratinous fibers, in an aqueous medium, of various agents such as rot-protecting agents, anti-moth agents, or water-proofing agents.

The invention also consists in new industrial products prepared by the process herein described, and more particularly in a new fibrous material comprising at least in part keratinous fibers of which the epicuticle has been removed.

The invention further provides a new fibrous material comprising at least in part keratinous fibers from some of which the epicuticle has been removed more completely than from others, said material being differentially dyed corresponding to the differential removal of the epicuticle from the fibers.

Figure 2:
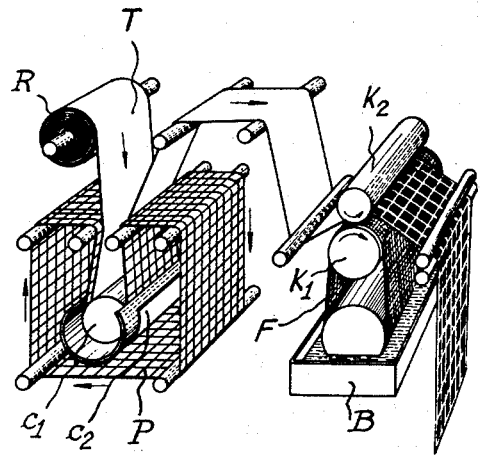
Figure 3:
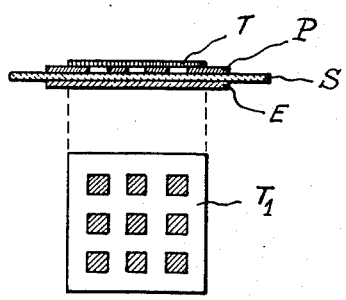
Figure 4:
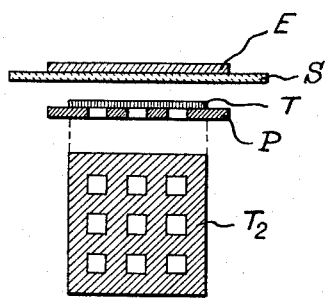

In order that the invention may be more clearly understood, reference will now be made to the accompanying drawings, in which:

FIGURE 1 is a diagrammatic view of an apparatus for the continuous operation of the process according to the invention, FIGURE 2 is a perspective view of part of an apparatus for the continuous reproduction of a decorative pattern on a material, FIGURES 3 and 4 are diagrams showing the inverse effects which may be obtained by changing the position of the material with regard to the stabilization layer disposed between the electrodes, FIGURE 5 is a graph showing the colorant absorption curves of fibers as a function of the dyeing temperature, FIGURE 6 is a graph showing a similar curve as a function of the duration of exposure to a specific electric discharge.

FIGURE 7 is a side view of a first disposition of the stabilization layers with reference to the electrodes of a discharge reactor, FIGURE 8 is a graph illustrating, in relation to FIGURE 7, the variation of the electric field between the electrodes, FIGURE 9 is a side view of a second arrangement of electrodes with a single stabiblization layer, and FIGURE 10 is a graph similar to FIGURE 8 and showing the variation of the electric field during a half-cycle of the condenser of FIGURE 9.

In FIGURE 1 is diagrammatically shown an apparatus for carrying out the process according to the invention. This apparatus essentially comprises at I a chamber intended to subject a material T which is being unrolled from the roll R to the action of an ionic bombardment in a rarified atmosphere. To this end, the material T after passing through an air lock 10, which serves to maintain the rarified atmosphere in the chamber I, is guided by rollers 11 and 11' between the electrodes 12 of a set of plane condensers, the length of the path between these electrodes being related to the unrolling speed of the material T so as to insure a sufficient duration and intensity of the treatment. In a particular case the characteristics of the system are the following: the discharge reactor comprises a group of 12 condensers consisting of 24 plates of duralumin of each of a size 46 x 150 cm. and of a thickness of 4 mm., and 24 "Bakelite" plates each of a size 60 x 164 cm. and of a thickness of 2 mm., the assembly comprising also a mechanical driving device for the material with 14 driving and guide rollers, a motor and speed regulator, and a support frame mounted on a platform carriage. The set of condensers thus has in all 12 passages each of 46 cm., or a total of 5.5 meters of useful treatment passage. The average duration of the treatment being 3 minutes, the apparatus will deliver 20×5.5 meters of 110 meters of material per hour. The capacity of the apparatus is calculated for 50 meters of material 140 cm. wide, with a maximum weight of the order of 500 grams per square meter, which will be treated in 30 minutes.

The average consumption of energy is established at 16 kw./h. for a surface of 140 square meters of treated material.

The reactor is fed by a 50/500 cycle converter group equipped with a three-phase motor 19, and an alternator 20 the exciting voltage of which is adjusted by means of a variable transformer 21. The alternating voltage taken from the terminals of the alternator is fed to the terminals of the primary winding of a single-phase high voltage transformer 23, the secondary winding of which provides a voltage of 2 to 5 kv. necessary for the functioning of the discharge reactor. Apart from this the apparatus has a control desk grouping the control apparatus and the apparatus for regulating the vacuum created by a pump 27 and indicated by the gauge 26, and for regulating the tension and the speed of the material in the discharge reactor.

On leaving the chamber I the material passes through an air lock 13 and then passes into a dyeing system II, the size of this system II, and also whether it operates hot or cold, being selected with regard to the colorant used and the characteristics of the treatment applied in chamber I in such a way that the duration of the material in the system II will be sufficient to achieve the desired dyeing. The material then passes into the vaporizing device 14 and then into a washing device 15, a rinsing device 16, through wringing rollers 17, and through a dryer 18 before being wound on a roller R'.

FIGURE 2 diagrammatically shows a part of another embodiment of apparatus for obtaining, by simple fulling, a continuous printing effect on a material. Material T is unwound from a roller R and passes between the electrodes $C_1$ and $C_2$ of a condenser in synchronism with a mask or stencil plate P shown here in the form of an endless band moving in contact with the material between electrodes $C_1$ and $C_2$. The first stage of the treatment is conducted under the conditions referred to above with reference for example to FIGURE 1, and then the material carrying a latent image of the stencil plate P is fed to a fulling device comprising a vat of dye B the contents of which are applied by means of a fulling member F to the material T pressed between two cylinders $K_1$ and $K_2$. At the output of this device is obtained a material carrying the pattern of the stencil plate P.

FIGURES 3 and 4 show how it is possible, by means of the same stencil plate of conductive material and performing the function of an electrode, to obtain either "positive" or "negative" patterns by simply changing the position of the members in the first stage of the process.

In these figures the material is denoted by T, a perforated electrode by P, a stabilization layer by S, and an imperforate electrode by E. As can be seen, the stabilization layer S is always between the two electrodes, but depending upon whether the material T is outside the interelectrode space (FIGURE 3) or within the interelectrode space (FIGURE 4), although in both cases in contact with the perforated electrode P, the image of the pattern of the perforations of the electrode P produced on the material will be either positive ($T_1$) or negative ($T_2$).

In another modification of the process, the localized action of the discharge may be produced by using a movable point electrode by means of which may be drawn, for example by hand or by suitable mechanism, a latent inscription or design on a material resting on another plane electrode acting as a table. After passing through the dyeing bath, any part of the material situated between the table electrode and the places where the point electrode was applied against the material will give rise to a colored zone on the material.

If reference be now made to the graph of FIGURE 5, the curve 1 illustrates the quantity Q of colorant absorbed by untreated fibres in relation to the temperature of the dye bath and curve 2 is a corresponding curve obtained by passing through the same bath fibers which have been subjected to a preliminary ionic bombardment under the following conditions: a discharge reactor having a single stabilization layer of "Bakelite" of a thickness of 3 mm., an interelectrode spacing of 10 mm., an alternating voltage of 4 kv.—500 cycles per second, pressure of air in the chamber 100 mm. of Hg, and duration of the treatment varying between 0 and 10 minutes. $Q=100\%$ when the dyeing bath reaches total exhaustion i.e. when the entire quantity Q of colorant originally contained in the bath has been fixed by the wool.

The curve in FIGURE 6 illustrates in a similar way the quantity Q of colorant fixed by cold dyeing (20° C.) followed by thermo-fixing at 110° C. for 15 minutes on wool fibers in relation to the time in minutes of the passage of the fibers in the electric field under the above mentioned conditions. It may be seen that with a duration of about 5 minutes a practically maximum absorption is obtained which afterwards increases only slightly with an increase in the treatment time.

The curves in FIGURES 5 and 6 show the general course of the phenomenon which, apart from the experimental conditions described above, also depends upon the nature and the origin of the fibers as well as upon the chemical changes to which the fibers may have been subjected before the application of the electric discharge treatment. An appreciation of the variation of quantity of colorant fixed by the fibers as a function of these different parameters has been made by visual examination of samples of wool subjected to the indicated conditions of treatment and dyeing. It is to be understood that the effective value of the quantity of colorant fixed by the fibers varies in each particular case, to a greater or less extent, depending upon the chemical constitution of the colorant material used.

It is also pointed out that the superficial modification of the fibers by the electric discharge treatment is irreversible, and that the second stage of the process according to the invention can follow the first after a prolonged interval of time.

It will be noted with reference to the curves of FIGURE 5 that at a temperature for example of 20° C., some fibers are not sensitive to some colorants if they have not been subjected to the first stage of the treatment of the invention (point A) after which treatment they take up a substantial quantity of colorant (point B). This explains why it is possible to obtain areas which are practically undyed when material, which has been subjected to the first stage of the invention with the interposition of masks or which comprises fibers which have not been subjected to the first stage, is entirely immersed in a dye bath.

Referring to FIGURES 7 and 8, at $E_1$ and $E_2$ are shown the two electrodes of a condenser and at $S_1$ and $S_2$ the stabilization layers associated with these electrodes. FIGURE 8 shows a curve of the variation of the electric field between the electrodes, which curve shows the uniformity of the field in the space between the stabilization layers and enables a thick material to be passed through as diagrammatically shown at A (FIGURE 7) so as to subject it substantially uniformly to the action of the electric discharge.

On the other hand, examination of FIGURES 9 and 10, which show a condenser comprising only a single stabilization layer $S_2$ near the positive electrode $E_2$, shows that the curve representing the variation of the electric field between the electrodes of the condenser has a quite different shape and that it is important to cause the material T to move in the zone where the gradient of the field is at its maximum as shown in FIGURE 9. It is in this zone that a mask or stencil plate of a non-conductive material should be placed against the material T in order to localize the effects of the electric discharge to produce, following dyeing, the reproduction of the pattern corresponding to that of the mask or stencil plate.

Various practical examples of the invention will now be described.

*Example 1*

This example serves to illustrate the efficiency of the process with regard to the dyeing of a woolen serge by means of four red colorants (following the process outlined above with regard to the influence of the duration and the temperature of the dyeing. Four treated and four untreated samples of woolen serge were dyed by means of the following colorants: Acetacide Red R2B having a Color Index No. 15,620, Acetacide Red R3B having a Color Index No. 16,180, Brilliant Acetacide Red R having a Color Index No. 16,255, and Light Sulfacide Red BR having a Color Index No. 18,050. The treated samples were subjected before dyeing to an electric discharge as described above (3.5 kilovolts for 5 minutes). The application of the bath is, in both cases, carried out as follows: Ratio of the bath 1/50, colorant 1%, sulphuric acid 3%, sodium sulphate 10%, dispergine 5%, duration 10 minutes at 80° C. The very superior quality of the samples treated with the electric discharge is clearly visible.

Relative to the dyes referred to hereinabove, the following equivalent identifications are to be found in Colorants Acides Sur Laine, Compagnie Francaise des Matieres Colorants (available to the public in 1959 or earlier):

C.I. 15,620—Acid Red 88, Rouge Acetacide R2B, Roccelline S

C.I. 16,180—Acid Red 17, Rouge Acetacide 3B, Cerasine

C.I. 16,255—Acid Red 18, Rouge Acetacide R, Ponceau Acid 3R

C.I. 18,050—Acid Red 1, Rouge Sulfacide Lumiere BR, Azonapthol Red

*Example 2*

A sample of felt, preliminarily dyed yellow, is exposed to an electric discharge for one minute at 4 kv. with a paper mask perforated according to the decorative pattern interposed. Over-dyeing in the cold (20° C.) with Light Sulfacide Red colorant followed by thermo-fixation of the red colorant at 110° C. for 15 minutes, produced a red pattern through the thickness of the felt material corresponding to the treated parts, the background remaining yellow.

*Example 3*

A sample of felt, first of all colorant beige, was exposed to an electric discharge for one minute at 4 kv. with a paper mask perforated according to the decorative pattern interposed. Over-dyeing in the cold (20° C.) with Neolan Blue colorant 2G C.I. 15,050 followed by thermo-fixation of the blue colorant at 110° C. for 15 minutes, produced a blue pattern through the thickness of the felt corresponding to the treated parts, the masked areas of the felt remaining beige in color.

*Example 4*

This example illustrates the two stages of "printing" of a dual colored pattern of the "tartan" type on to a felt material.

*First stage.*—The felt, initially dyed yellow in an open heated bath, is exposed to an electric discharge with the interposition of a paper mask in the form of spaced strips and then colored by fulling in the cold in a bath containing blue colorant (Neolan Blue 2G C.I. 15,050) which only takes on the parts of the felt unprotected by the mask. Thermo-fixing of the colorant is effected at 110° C. for 15 minutes.

*Second stage.*—After rinsing, wringing and drying, the sample is again introduced into the discharge reactor and again treated but with the mask turned through 90° so that the stripes to be produced will be at right angles to the stripes produced in the first stage. The drying is again carried out in the cold using a red colorant (Light Sulfacide Red). Thermo-fixing of the colorant is again effected at 110° C. for 15 minutes.

It is to be understood that the above examples have no limitative character. In particular the examples of printing on felt could have been carried out on woven materials. With regard to this it will be noted that the difference in effect between an actual "printing" and the results of the process according to the invention is observed, in particular, in the fact that with the process of the present invention the material receives a colored pattern through its entire thickness, that is the pattern appears on both faces of the material just as it appears in the case of colored patterns woven with colored threads, while materials printed by conventional processes have the pattern appearing only on one face of the material, namely that on which the printing has been applied, the other face remaining practically unchanged.

It is to be noted that in the application of the process for obtaining relief effects, two modifications are possible. In the first the material locally subjected to the electric discharge is afterwards plunged into a bath containing an agent which provokes shrinkage of the fibers which absorb it. It is the fibers which have been subjected to the discharge which preferentially absorb this agent and will shrink to the greatest extent, the other fibers shrinking only slightly. Conversely, in the second case, the material is simply plunged into a felting bath and it is then that the fibers which are not subjected to the discharge will shrink the most, the discharge tending on the contrary to oppose felting.

It is also to be understood that while sometimes dyeing is referred to and sometimes printing is referred to, the invention is equally applicable to bath dyeing or to fulling dyeing, as well as to printing in all its methods of application and also to the more general application of any liquid treatment agent of which the absorption by the fibers is favored by an electric discharge treatment.

I claim:

1. Process for the treatment of a material containing keratinous fibers, said process consisting essentially of altering said keratinous fibers with respect to the felting property thereof, as well as the capability thereof to accept a dye or any chemical reactive in a liquid form, by permanently modifying the surface zone of said fibers and eliminating a part of the surface material of said zone by passing the material in a rarefied atmosphere for a period of time of about up to ten minutes between a pair of electrodes which are connected to an electrical source of a frequency between 50 and 1000 cycles per second and of sufficient voltage to cause ionization of the rarefied atmosphere and silent electric discharge and thereafter applying to the thusly treated material having the altered properties in the surface zone thereof a liquid dye solution.

2. A process as claimed in claim 1 comprising selectively screening portions of said material as the same passes between said electrodes to form juxtaposed zones of exposed and screened portions having different affinities to said liquid dye solution.

3. A process as claimed in claim 1 comprising forming prior to the application of the liquid dye solution a composite material consisting of the thusly treated material and untreated material and thereafter applying the liquid dye solution to the composite material.

4. A process as claimed in claim 2 wherein said selective screening is obtained by interposing a screen insulative to said ionization between said material and said electrodes and wherein the screen is provided with openings arranged in a pattern corresponding to the desired juxtaposition of said zones.

5. A process as claimed in claim 2 wherein said selective screening is obtained by interposing an electrically conductive screen between said material and said electrodes and wherein the screen is provided with openings arranged in a pattern corresponding to the desired juxtaposition of said zones.

6. A process as claimed in claim 2 comprising drying the material after the same leaves said aqueous dye solution, then repassing the material between said electrodes in the ionized atmosphere while selectively screening the material to produce second juxtaposed zones of different affinity to the liquid dye solution and passing the latter material through a second aqueous dye solution to produce respective colored zones in said material whereby a plaid design may be obtained.

References Cited by the Examiner

UNITED STATES PATENTS

| 1,338,353 | 4/20 | Bloom. | |
| 1,933,810 | 11/33 | Keynon. | |
| 2,366,347 | 1/45 | Millson | 8—2 |
| 2,580,873 | 1/52 | Womble | 8—2 |
| 2,724,692 | 11/55 | Akerlof | 204—312 |
| 2,728,723 | 12/55 | Akerlof | 204—312 |
| 2,810,933 | 10/57 | Pierce et al. | |
| 2,940,869 | 6/60 | Graham. | |
| 2,956,899 | 10/60 | Cline. | |
| 2,977,475 | 3/61 | Kassenbeck | 8—2 X |
| 3,057,792 | 10/62 | Frohlich | 117—93 |

OTHER REFERENCES

Alexander et al.: Wool, Its Chemistry and Physics, pp. 6–10, 174–175, pub. by Reinhold Pub. Corp., New York, N.Y.

Kirby: The Textile Research Journal, June 1, 1955, pp. 569–570.

NORMAN G. TORCHIN, *Primary Examiner.*

WILLIAM B. KNIGHT, MORRIS O. WOLK,
*Examiners.*